United States Patent [19]

Schoen et al.

[11] Patent Number: 5,247,175
[45] Date of Patent: Sep. 21, 1993

[54] METHOD AND APPARATUS FOR THE DECONVOLUTION OF UNRESOLVED DATA

[75] Inventors: Alan E. Schoen, San Jose; Edward G. Cope, deceased, late of San Jose, by Catherine Cope, legal representative; John E. Tinnon, San Francisco, all of Calif.

[73] Assignee: Finnigan Corporation, San Jose, Calif.

[21] Appl. No.: 889,524

[22] Filed: May 27, 1992

[51] Int. Cl.$^5$ ............................................. H01J 49/00
[52] U.S. Cl. .................................. 250/281; 250/282
[58] Field of Search ............................... 250/281, 282

[56] References Cited

PUBLICATIONS

"The Deconvolution Problem: An Overview," by Sedki M. Riad, Proceedings of the IEEE, vol. 74, No. 1, (Jan. 1986) 82-85.

"A Quantitative Evaluation of Various Iterative Deconvolution Algorithms," by Paul B. Crilly, IEEE Transactions on Instrumentation and Measurement, vol. 40, No. 3, (Jun. 1991) 558-562.

"Iterative and Function-Continuation Fourier Deconvolution Methods for Enhancing Mass Spectrometer Resolution," by Juliette W. Ioup, et al., International Journal of Mass Spectrometry and Ion Processes, 55 (1983/1984) 93-109.

"The Regularized Inverse Convolution Approach to resolving Overlapping Mass Spectral Peaks" by V. V. Raznikov, et al., International Journal of Mass Spectrometry and Ion Processes, 103 (1991) 67-79.

"A Technique for the Evaluation of Signal Enhancement with Application to Gamma Ray Spectra," by T. J. Kennett, et al., Nuclear Instruments and Methods in Physics Research A239 (1985) 260-268.

"Self Modeling Curve Resolution," by William H. Lawton, et al., Technometrics, vol. 13, No. 3, (Aug. 1971) 617-633.

"Quantitative Resolution of Fused Chromatographic Peaks in Gas Chromatography/Mass Spectrometry," by M. A. Sharaf, et al., Analytical Chemistry, vol. 54, No. 8, (Jul. 1982) 1291-1296.

*Primary Examiner*—Jack I. Berman
*Attorney, Agent, or Firm*—Flehr, Hohbach, Test, Albritton & Herbert

[57] ABSTRACT

The method and apparatus of the present invention detects and records a convolved series of impulses, and then mathematically extracts the intensity and position of each impulse using least squares with the constraint that the impulses are spaced with a constant interval and that the instrument's response to a single impulse is known. This constraint allows the expression of the problem in a form which is amenable to rapid solution in a mathematically robust manner that is tolerant to noise.

5 Claims, 12 Drawing Sheets

METHOD AND APPARATUS FOR THE DECONVOLUTION OF UNRESOLVED DATA

FIELD OF THE INVENTION

The present invention relates to mass spectrometers. More specifically, it relates to a method and apparatus to acquire a convolved series of impulses and then to mathematically extract the intensity and position of each impulse.

BACKGROUND OF THE INVENTION

Figure 1:
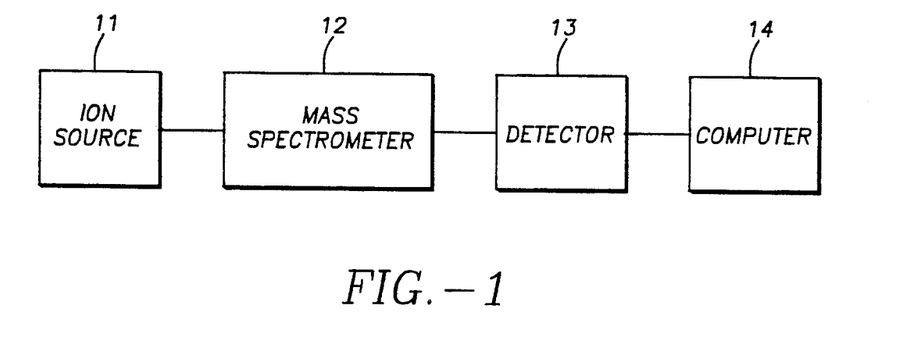
FIG. 1 is a block diagram of a typical analytical instrument configured to implement the described method.

Mass spectrometers have been used for mass and intensity measurements of charged and uncharged elementary particles, electrons, atoms, and molecules. The components of a mass spectrometer are depicted in FIG. 1. The ion source 11 provides an original signal source to the mass spectrometer 12 which provides an instrument response. It is well known that the data collected by a detector and digitization system 13 can be represented in Cartesian coordinates, wherein mass, t, is along the abscissa and intensity, y(t), is along the ordinate (see, for example, FIGS. 2 and 3).

Figure 2:
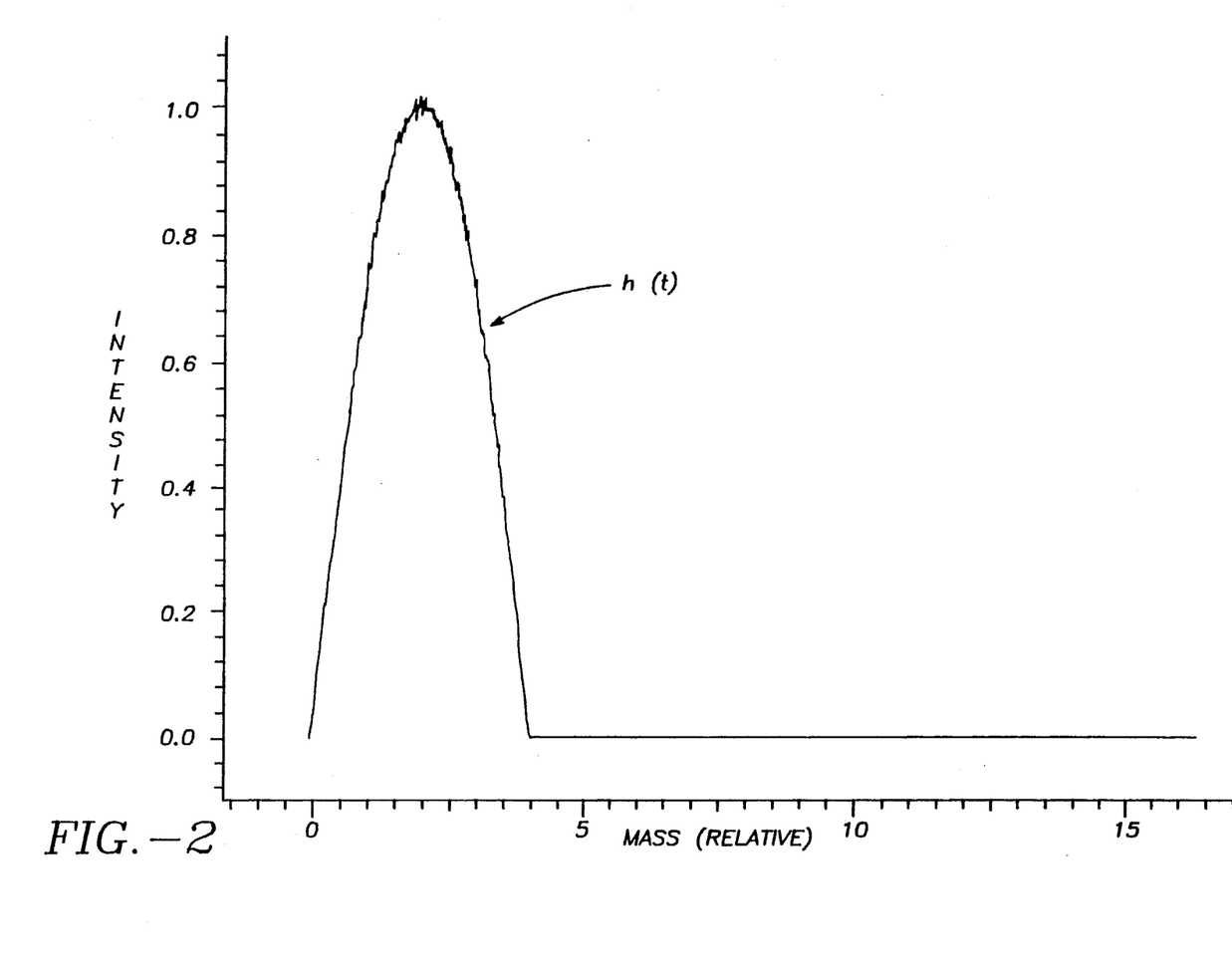
FIG. 2 is a typical model impulse response with a width of 4 AMU and a sample density of 50 samples per AMU. The noise on the response is Poisson noise with the maximum data point in the buffer corresponding to an intensity of 10000 ions.
Figure 3:
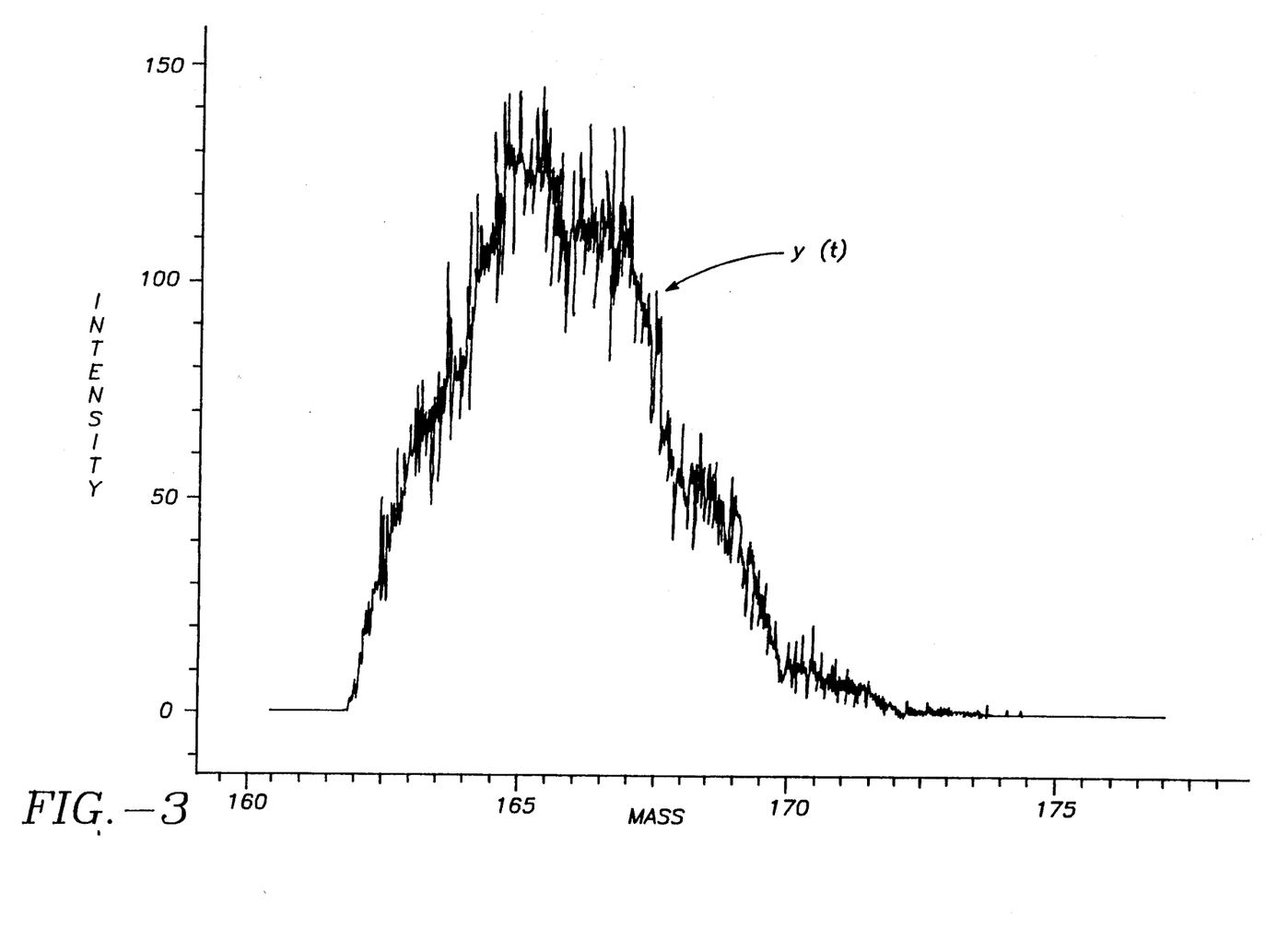
FIG. 3 is the convolution of the contrived data for tetrachloroethylene and the model instrument response. The underlying intensity of the largest peak in the cluster is assumed to be 100 ions per sample. Poisson noise is added to the resulting convolved cluster.

When a single impulse is detected by the mass spectrometer, the instrument can be characterized by an impulse response, h(t), as shown in FIG. 2 which depicts a model impulse response. Typically, however, more than one impulse is detected by the instrument. If the width of the impulse response is greater than the spacing between the impulses, then the output is a spectrum of an unresolved cluster of peaks, which is similar to that shown in FIG. 3, showing a mass spectrum, y(t), for $C_2Cl_4$ which is Contrived Data of 4 AMU Wide Peaks. The Poisson noise associated with discrete particle detection as shown in FIG. 3 hides the desired exact information. The noise shown assumes 100 ions/sample at the top of the most abundant peak.

Figure 4:
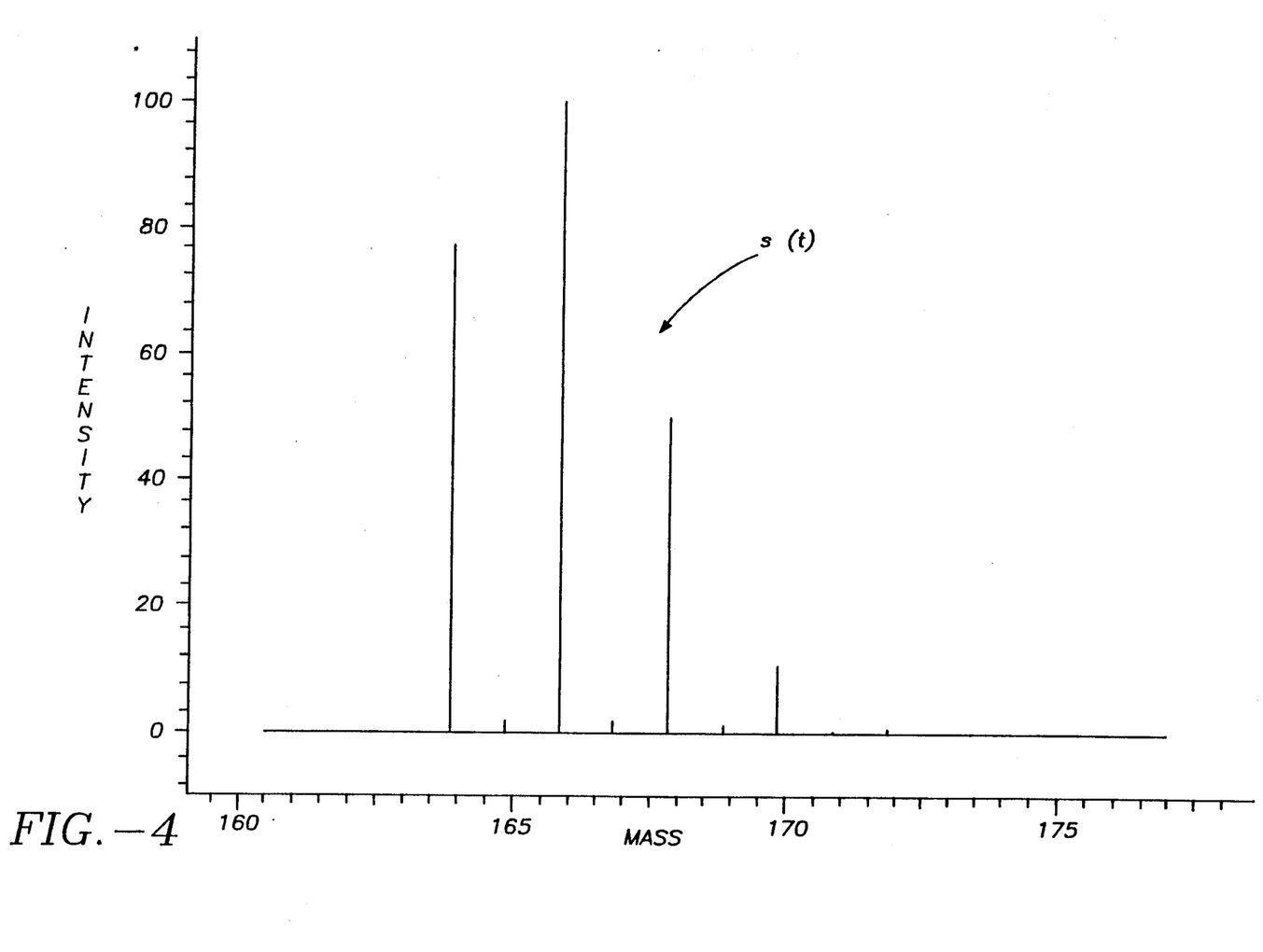
FIG. 4 is theoretically exact contrived data for tetrachloroethylene, $C_2Cl_4$. The relative peak intensities are calculated based upon standard isotopic distributions for carbon and chlorine.

It is desirable to reconstruct mass/intensity information as depicted in FIG. 4, which shows the theoretically exact mass spectrum, s(t), for $C_2Cl_4$.

It is known that the y(t) data, which is collected by the instrument, shown in FIG. 3, is the mathematical convolution of the two functions s(t) and h(t), (shown in FIGS. 4 and 2, respectively). The convolution of the two functions, which may be represented as s*h, smears the impulses at each mass by the response function. Again, the convolved output, y(t)=s(t)*h(t), is the data collected from the instrument.

The mathematics for convolution is well known, and the inverse of convolution may be easily expressed. It is desirable to obtain the inverse of the convolved output, that is, given h(t), deconvolve y(t), to obtain s(t), which represents the desired discrete information identifying the mass and intensity of the components of the sample.

An explanation of convolution is found in any text which includes a good discussion on Fourier transforms such as *Numerical Recipes in C*. The problem is that in real systems, there is noise associated with the observation of convolved system responses, and this noise is amplified by the mathematics of Fourier deconvolution to the point that the results are useless. There are also many iterative deconvolution methods which have seen limited success when the desired result is only several peaks.

A review which evaluates many of these methods has been published in *Transactions on Instrumentation and Measurement*, Vol. 40. No. 3. June 1991 pg. 558-562. titled A Quantitative Evaluation of Various Iterative Deconvolution Algorithms by Paul Benjamin Crilly. This paper shows results which are typical of the state of the art. Another recent publication demonstrates typical results for deconvolution of mass spectral data. *International Journal of Mass Spectrometry and Ion Processes*. 103 (1991) 67-79. is a paper titled The Regularized Inverse Convolution Approach to Resolving Overlapping Mass Spectral Peaks by V. V. Raznikov and M. 0. Raznikova. None of these methods makes the assumption that the peaks are located at regular intervals.

OBJECTS AND SUMMARY OF THE INVENTION

It is therefore a general object of the present invention to provide an improved method and apparatus for analyzing a mass spectrum.

It is another object of the present invention to provide a method to obtain the best estimate for the position and intensity of each peak in a cluster of mass spectral peaks when the peaks are unresolved.

It is a further object to obtain a discrete mass spectrum with significantly reduced noise.

It is yet another object of the present invention to provide for a fast and efficient method and apparatus for obtaining a discrete mass spectrum.

Figure 5:
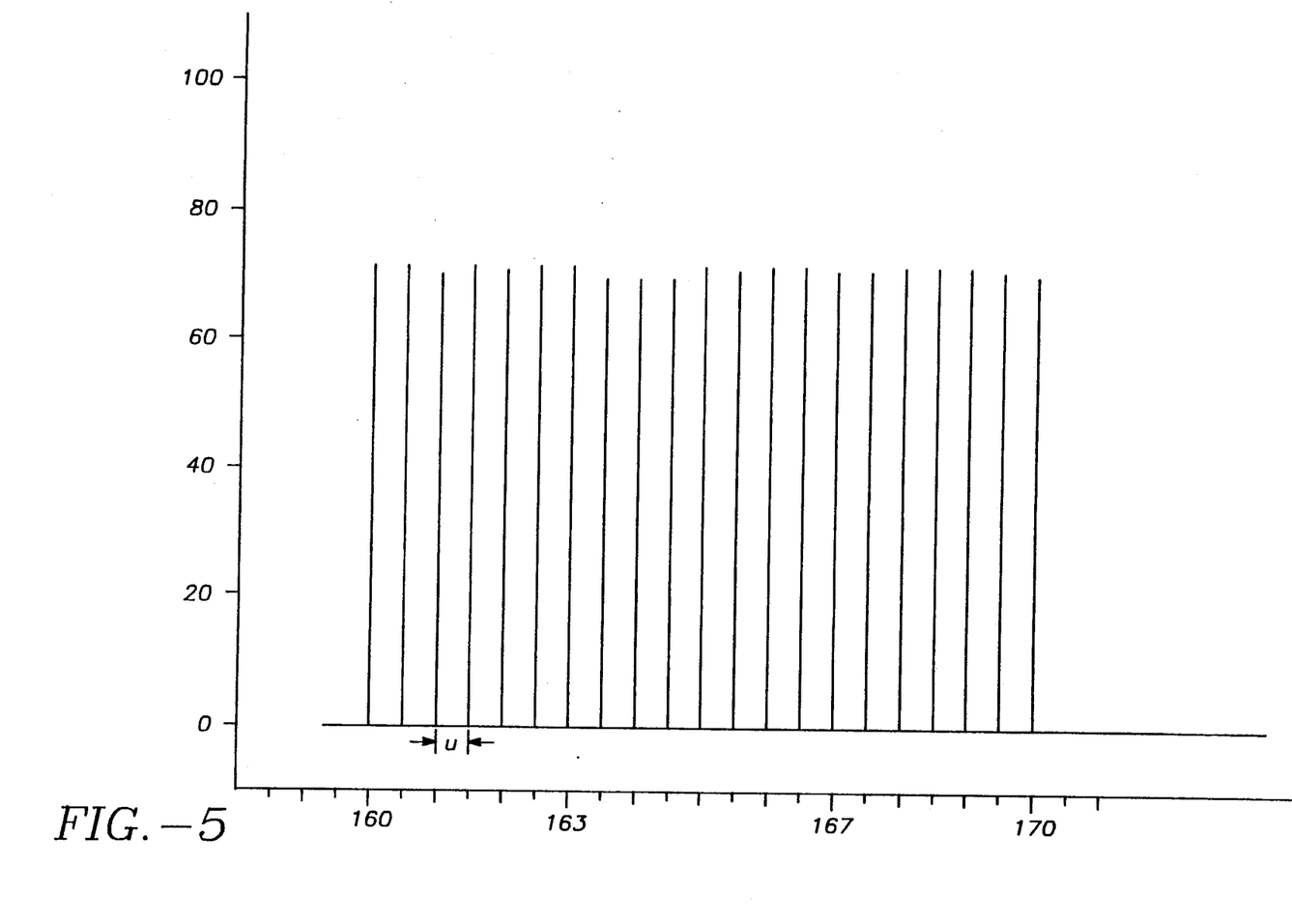
FIG. 5 shows a representative peak spacing interval.

The foregoing and other objects of the invention are achieved by a method and apparatus for deconvolving mass spectral data. An outline of the method and apparatus is as follows:

1. A model representation of the instrument's response to an impulse, h(t), is obtained. For mass spectrometry, this can be a resolved peak, a monoisotopic peak such as CsI or a peak from a tandem instrument where one of the two analyzers is set to pass only a single mass and the response of the other analyzer is obtained by scanning.
2. The desired peak frequency, such as one peak per AMU for normal mass spectrometry, or higher for mass spectrometry of multiply charged ions, is chosen. FIG. 5 shows a representative peak spacing interval of 2 peaks per AMU, for example.
3. The autocorrelation matrix, $R_{ff}$ or A, as described in the next section, is generated. The autocorrelation matrix fully characterizes the instrument response.
4. The inverse of the autocorrelation matrix, $A^{-1}$, is calculated.
5. The instrument's response to the signal of interest, y(t), which will typically be a cluster of unresolved mass peaks is obtained.
6. The cross correlation vector, $R_{yf}$ or b, using an arbitrary starting sample index is generated.
7. Because $A \cdot x = b$, $x = A^{-1}b$, therefore, by solving for the result vector x of weighting coefficients $a_j$, the result vector x is a vector which provides each value $a_j$ as the intensity of a corresponding peak.
8. The result vector x is convolved with the instrumental response to obtain a reconstructed signal which is an estimate of the original signal.
9. The reconstructed signal is compared with the original signal data, point by data point and the sum of each error squared is calculated.
10. Steps 6 through 9 are repeated for all possible starting sample indexes within the desired peak position range.
11. The lowest error is the best fit to the original data, therefore the best fit for the values of $a_j$ are the intensities of the peaks and each peak position corresponds to the position of the comb of peaks, with the spacing fixed according to the original assumption.

12. An overlapping portion of the original spectrum is windowed and all of the other steps are repeated. When finished, the entire spectrum is pieced together.

In summary, the method and apparatus of the present invention obtains an instrument's response to a model impulse, detects and records a series of impulses convolved with the instrument's response, and then mathematically extracts the intensity and position of each impulse using least squares with the constraint that the impulses are spaced with a constant interval. This constraint allows the expression of the problem in a form which is amenable to rapid solution in a mathematically robust manner that is remarkably tolerant to noise.

BRIEF DESCRIPTION OF THE DRAWINGS

Other objects, and many of the intended advantages of the present invention, will be readily appreciated as the same becomes better understood by reference to the following detailed description when considered in connection with the accompanying drawings wherein.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the claims.

In a mass spectrometer ions are generated in an ion source. For a beam machine, the ions may be measured as a flux in units of ions per second. When this beam is sampled for a finite period of time by an ion detection system, that system will observe an integral number of ions. For an ion storage device, the ion intensity may also be measured in units of ions so for the remainder of this discussion, it will be assumed that a measured sample will be in units of ions. This has the additional advantage that the uncertainty in a measurement may be accurately estimated since ion counting closely follows Poisson statistics. This will form the basis of the statistical evaluation of the reliability of the method using contrived data for $C_2Cl_4$ (see FIGS. 2-4).

The ion beam or ion cloud is composed of a mixture of different species, each of which has a specific elemental and isotopic composition. Each individual ionic species has an exact mass which is the sum of the exact masses of the component atomic constituents. Each species will be present in the ionic beam or cloud in a specific concentration. A listing of each specific mass with the corresponding intensity information is a mass spectrum.

Atoms are composed of protons, neutrons, electrons and the energy which binds the subatomic particles together. The mass of the electron is usually negligible in analytical mass spectrometry, so the molecular weights are typified by some multiple number of protons and neutrons which weigh roughly 1 Dalton. For this reason, a mass spectrum may be characterized as a sequence of discrete mass values which are separated by one Dalton and the corresponding intensity values. This is the basis for the validity of the constraint which requires evenly spaced peaks (see FIG. 5), separated by constant intervals, u. The mass defect is typically neglected across short mass range spans in low resolution mass spectrometry.

The instruments which are used to measure a mass spectrum have a characteristic response which broadens the mass value across a mass range with some arbitrary shape. When the response from one mass does not overlap with the response from a neighboring mass, a simple centroid may give a good estimate of the correct mass value and the corresponding intensity may be determined by summing the intensity of each sample within the peak. When the response from one mass overlaps the response from a neighboring mass an accurate centroid will not be possible (see FIG. 3), so some form of deconvolution will be required to accurately estimate the correct values for the mass and intensity of each species in the mass spectrum (see FIG. 4).

If the mass spectrum is modeled as a sequence of impulses of varying intensity, then the operation of convolution with the instrument response to a single mass will give an estimate of the instrument's response to a series of masses. The challenge is to extract the mass spectrum, given the instrument's response to a single mass and the instrument's response to the series of masses. This is possible if a simplification is made to require that the masses are spaced with some constant interval, u.

The present invention provides a method for deconvolution of unresolved spectral data which is robust in its tolerance for noise. The fundamental imposed constraint, that the data be approximated by a series of evenly spaced impulses (see step 2 in the above Summary of the Invention, and FIG. 5), does not restrict the use of the method of the present invention to systems which are purely linear and periodic. Most systems can be approximated by piecewise linear fits and these smaller linear pieces are good candidates for deconvolution by this new method. Also, if the response of the system to an impulse varies as a function of position within the data space, it may often be treated as constant across a defined range.

An important feature of the present invention is the constraint that the desired result is a series of evenly spaced impulses, with varying intensities. This constraint is particularly well suited for low resolution mass spectrometry and this is the model used for the following discussions, although it will apply to many other instrumental systems as well.

Ultimately, as will be shown in the following derivation, the extraction of the mass spectrum is obtained by generating the result vector x and convolving it with the instrumental response h(t) to obtain a reconstructed signal which is an estimate of the original signal. The result vector x is a vector which provides each value $a_j$ as the intensity of a corresponding peak.

With the constraint that the masses are spaced with some constant interval, u, (see FIG. 5), a mass spectrum, relative to some initial mass t, may be approximated by equation (1) where the desired mass spectrum is the signal, represented as model s(t).

$$s(t) = \sum_{j=0}^{\infty} a_j(t - ju) \quad (1)$$

When the instrument is scanned in a mass linear fashion, the instrument response and the acquired mass spectrum may be represented as a sequence of samples in the time domain where each sample is separated in time by some arbitrary quantity. The individual peaks are assumed to lie at even intervals u and the intensity of each peak is the weighting coefficient $a_j$. The desired mass spectrum is the signal, represented as model s(t). The instrument response is a finite impulse response represented as h(t). The convolution of the two functions may be represented as s*h. This smears the impulses at each mass by the response function. The convolved output y(t) is the data which is collected from the instrument. If the underlying mass spectra signal s(t) may be estimated by equation (1) then the convolved output may be estimated by equation (2).

$$y(t) = \sum_{j=0}^{\infty} a_j h(t - ju) \quad (2)$$

where $a_j$ is the weighting coefficient and u is the delay or mass or time shift. The method of least squares is used to obtain the best values for $a_j$ which will make the error between the model function y(t) and the acquired data from the real system $\hat{y}(t)$ a minimum. The error may therefore be represented as equation (3).

$$error = y(t) - \hat{y}(t) \quad (3)$$

If equation 3 is sampled with n samples across the region of interest, then the mean squared error, mse, is given by equation (4).

$$mse = \frac{1}{n} \sum_n [y(t) - \hat{y}(t)]^2 \quad (4)$$

In equation (4) n is the number of data points in the sampled spectrum. (In this and all equations that follow, n is related directly to t by a sample rate which is in unit of samples per AMU or peak which is in turn related to time by the scan rate which is in peaks or AMU per second). If the expression for $\hat{y}(t)$ is substituted one obtains equation (5) where j is the index for each peak and the corresponding shift associated with the position of each peak.

$$mse = \frac{1}{n} \sum_n \left[ y(t) - \sum_j a_j h(t - ju) \right]^2 \quad (5)$$

This may be expanded to give equation (6)

$$mse = \frac{1}{n} \sum_n \left[ y^2(t) - 2y(t) \sum_j a_j h(t - ju) + \left[ \sum_j a_j h(t - ju) \right]^2 \right] \quad (6)$$

To minimize this error, generate a system of equations such that the change in the mse with respect to each value of $a_j$ may be obtained. This is shown in equation (7).

$$\frac{\partial mse}{\partial a_j} \bigg|_{j=J} = \sum_n - 2y(t) h(t - ju)|_J + \sum_n \sum_j a_j h(t - ju)|_J h(t - Ju) \quad (7)$$

Next, minimize the error by setting the derivative to zero for each value of j. In addition, the constant 2 may be canceled from each term of the equation to give a system of equations, one for each weighting coefficient or peak $a_j$ as shown in equations (8).

$$\frac{\partial mse}{\partial a_0} = 0 = -\sum_n y(t) h(t - 0u) + \sum_n h(t - 0u) \sum_j a_j h(t - ju)$$

$$\frac{\partial mse}{\partial a_1} = 0 = -\sum_n y(t) h(t - 1u) + \sum_n h(t - 1u) \sum_j a_j h(t - ju)$$

$$\vdots$$

(8)

This is repeated for all weighting coefficients $a_1$, $a_2$, $a_3$ etc . . . to construct the matrix representation for this system of equations.

$$\begin{bmatrix} \sum_n h(t-0u)h(t-0u) & \sum_n h(t-0u)h(t-1u) & \cdots \\ \sum_n h(t-1u)h(t-0u) & \sum_n h(t-1u)h(t-1u) & \cdots \\ \sum_n h(t-2u)h(t-0u) & \sum_n h(t-2u)h(t-1u) & \cdots \\ \vdots & \vdots & \end{bmatrix} \begin{bmatrix} a_0 \\ a_1 \\ a_2 \\ \vdots \end{bmatrix} = \quad (9)$$

$$\begin{bmatrix} \sum_n y(t)h(t-0u) \\ \sum_n y(t)h(t-1u) \\ \sum_n y(t)h(t-2u) \\ \vdots \end{bmatrix}$$

The substitutions shown in equations (10) are made for clarity.

$$\text{let } f_j = h(t - ju) \text{ and } y = y(t) \quad (10)$$

With these substitutions a general solution in the form of equation (11) may be written.

$$\begin{bmatrix} \Sigma f_0 f_0 & \Sigma f_0 f_1 & \Sigma f_0 f_2 & \cdots \\ \Sigma f_1 f_0 & \Sigma f_1 f_1 & \Sigma f_1 f_2 & \cdots \\ \Sigma f_2 f_0 & \Sigma f_2 f_1 & \Sigma f_2 f_2 & \cdots \\ \vdots & \vdots & \vdots & \end{bmatrix} \begin{bmatrix} a_0 \\ a_1 \\ a_2 \\ \vdots \end{bmatrix} = \begin{bmatrix} \Sigma y f_0 \\ \Sigma y f_1 \\ \Sigma y f_2 \\ \vdots \end{bmatrix} \quad (11)$$

Since shifting both series by the same amount is the same as not shifting at all, equation (12) will lead to further simplification.

$$f_0 f_0 = f_1 f_1 = f_2 f_2 = f_3 f_3 = f_4 f_4 \ldots \quad (12)$$

Likewise, any constant difference in the amount of shift gives the same result so equations (13) will lead to still further simplification.

$$\begin{aligned} \ldots f_1 f_0 &= f_0 f_1 = f_1 f_2 = f_2 f_3 = f_3 f_4 \ldots \\ \ldots f_2 f_0 &= f_0 f_2 = f_1 f_3 = f_2 f_4 = f_3 f_5 \ldots \\ \ldots f_3 f_0 &= f_0 f_3 = f_1 f_4 = f_2 f_5 = f_3 f_6 \ldots \end{aligned} \quad (13)$$

This allows substitutions which forces the diagonals of the main matrix to be constant, therefore equation (14) is an accurate expression of the problem to be solved.

$$\begin{bmatrix} \Sigma f_0 f_0 & \Sigma f_0 f_1 & \Sigma f_0 f_2 & \Sigma f_0 f_3 & \cdots \\ \Sigma f_0 f_1 & \Sigma f_0 f_0 & \Sigma f_0 f_1 & \Sigma f_0 f_2 & \cdots \\ \Sigma f_0 f_2 & \Sigma f_0 f_1 & \Sigma f_0 f_0 & \Sigma f_0 f_1 & \cdots \\ \Sigma f_0 f_3 & \Sigma f_0 f_2 & \Sigma f_0 f_1 & \Sigma f_0 f_0 & \cdots \\ \vdots & \vdots & \vdots & \vdots & \end{bmatrix} \begin{bmatrix} a_0 \\ a_1 \\ a_2 \\ a_3 \\ \vdots \end{bmatrix} = \begin{bmatrix} \Sigma y f_0 \\ \Sigma y f_1 \\ \Sigma y f_2 \\ \Sigma y f_3 \\ \vdots \end{bmatrix} \quad (14)$$

Each term of $f_0 f_k$ is the $k^{th}$ lag of the autocorrelation of the instrument response function f. Each term of $y f_k$ is the $k^{th}$ lag of the cross correlation of the instrument response function f and the acquired data y. The final result may therefore be expressed in the readily recognized form where $R_{ff}$ is the autocorrelation function and $R_{yf}$ is the cross correlation function. This is shown in equation (15).

There are several characteristics of this system of $$\begin{bmatrix} R_{ff}(0) & R_{ff}(1) & R_{ff}(2) & \cdots \\ R_{ff}(1) & R_{ff}(0) & R_{ff}(1) & \cdots \\ R_{ff}(2) & R_{ff}(1) & R_{ff}(0) & \cdots \\ \vdots & \vdots & \vdots & \end{bmatrix} \begin{bmatrix} a_0 \\ a_1 \\ a_2 \\ \vdots \end{bmatrix} = \begin{bmatrix} R_{yf}(0) \\ R_{yf}(1) \\ R_{yf}(2) \\ \vdots \end{bmatrix} \quad (15)$$

equations which expressed in this form make it readily evaluated. First, the instrument response function has a finite width and goes to baseline or zero beyond this width. When the autocorrelation function is for a shift larger than the width of the instrument's response, then the value is zero. For example, if the instrument response has a peak width of 4 AMU and the desired result is a series of impulses with a spacing of 1 AMU then there are only 3 shifts other than a shift of zero which will yield a non-zero value. The calculation of these 4 autocorrelation values allows the seven diagonals to be filled. The span of the cluster of peaks to be deconvolved determines the number of weighting coefficients $a_j$ to be determined and the overall size of the resulting matrix. It is necessary to window and pad the acquired data with zeros to a width equal or greater than the impulse response width to prevent end effects in the calculation.

Equation (15) is a special form known as Toeplitz which may be solved in one operation; however, the nature of the problem makes the two step singular value decomposition (SVD) method preferable. The SVD method is well documented in standard numerical methods books such as Numerical Recipes in C and is referred to as the method of choice for solving most linear least squares problems.

Briefly, SVD converts the standard form for the solution of $A \cdot x = b$ from $x = A^{-1} b$ to a form where $A^{-1}$ is replaced by $V \cdot W \cdot U^T$. With this formulation, U and V are orthogonal matrices and W is a diagonal matrix. Any small scaler values along the diagonal of the W matrix may be set to zero.

Noise does not interfere with the solution of the pseudoinverse since SVD is itself a best fit method and errors due to noise and round off error do not propagate from the early ranks to the latter. In this application, the calculation of the pseudoinverse characterizes the instrument response across a given range of masses at a given peak spacing. The back substitution which uses this pseudoinverse and the cross correlation vector b to calculate the vector x of values for $a_j$ is the quickest part of the operation and may be accomplished in real time for repetitive acquisition of data across the mass range of interest, which is a typical operation mode for a mass spectrometer and similar to the operation of many other analytical instruments.

The final part of the operation to be discussed is the proper alignment of the evenly spaced peaks with their correct position within the acquired data. If the correct position of the peaks is known from a prior experiment or instrument calibration, then that information may be used to correctly specify the starting index for the cross correlation step. In this case, only the relative peak intensities are unknown.

It is not necessary to know the correct position for this method to be applied since each possible position may be tried and the correct one determined by convolving the solution vector x with the instrument response function h and comparing the result with the original data buffer. The best fit will be the one with the lowest mean squared error. From the shift associated with the lowest mse, the correct mass position for the cluster of peaks may be determined; and the values for $a_j$ in the solution vector x associated with the lowest mse is the overall best estimate for the intensity of each peak within the cluster.

The nature of the method characterizes the response of the instrument and places most of the computational burden upon that step such that the final step which includes the measured data to be deconvolved is relatively simple. Modern digital signal processors and array processors may often accomplish this final step as rapidly as the raw data is acquired so that the results are available in real time with an appropriate time lag.

Figure 6:
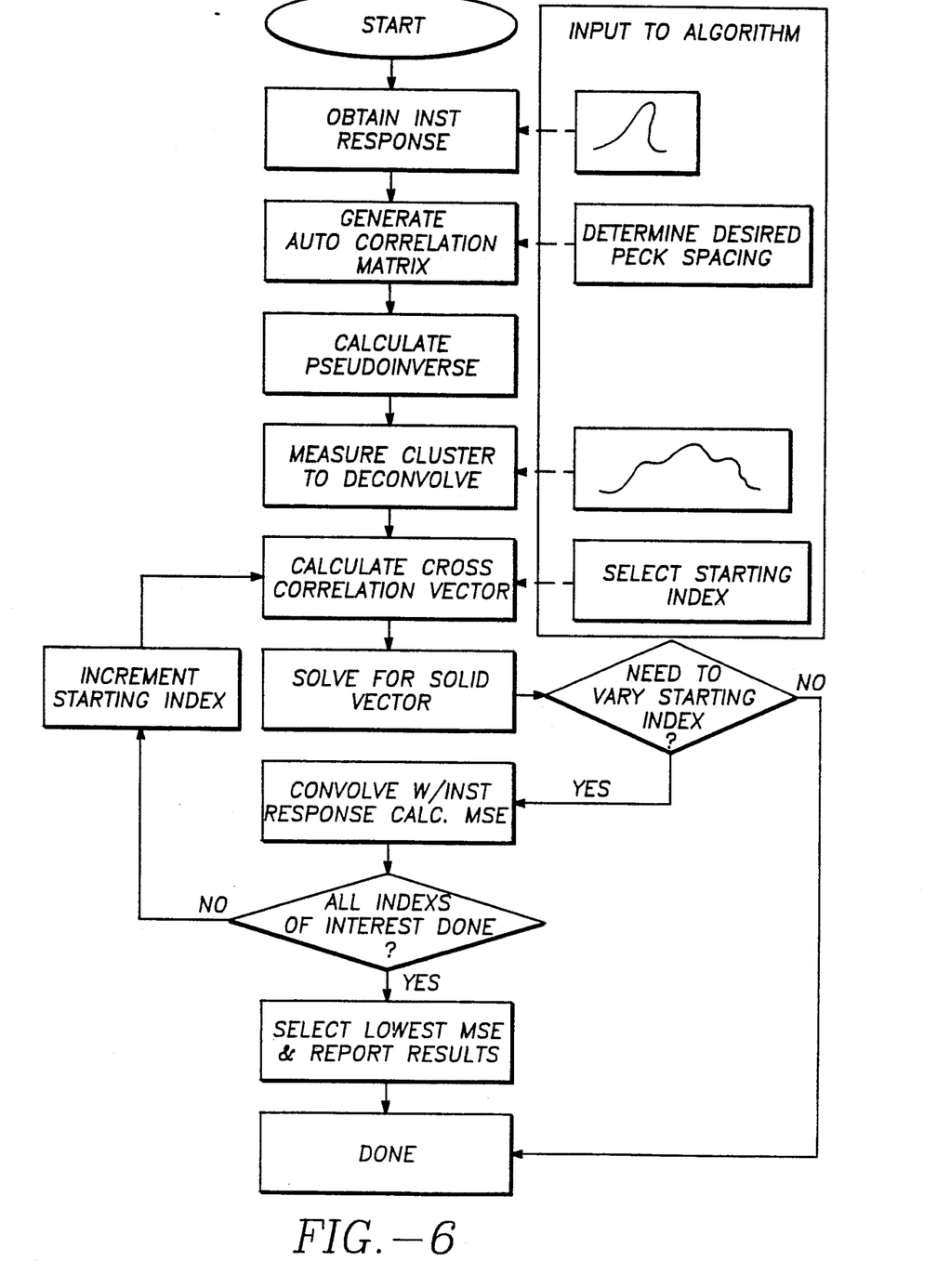
FIG. 6 is a flow chart of the deconvolution method of the present invention.
Figure 7:
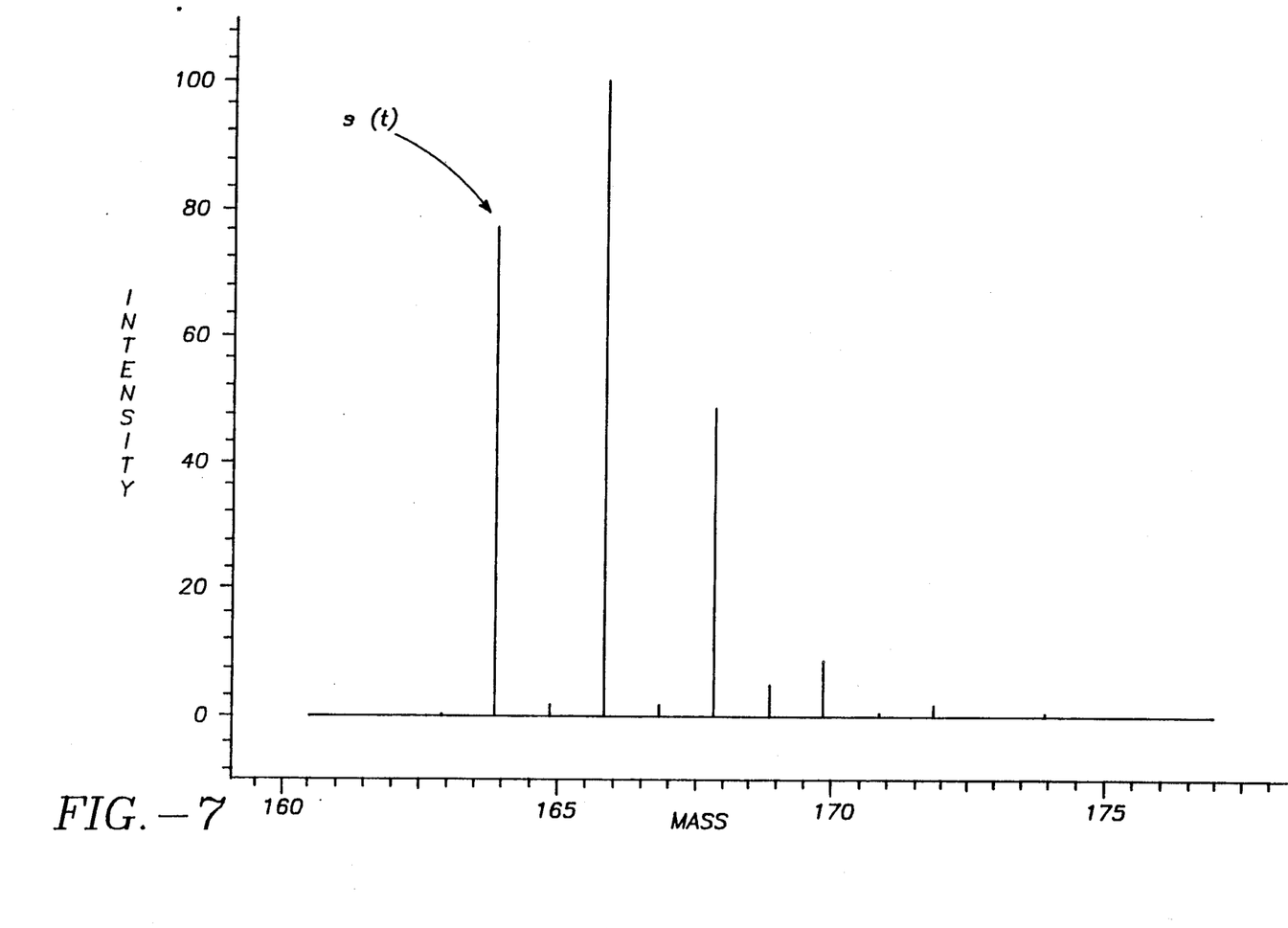
FIG. 7 is the actual deconvolution result when the convolved data in FIG. 3 and the model instrument response in FIG. 2 is used as input.

FIG. 6 shows a flow chart of the deconvolution method of the present invention which correlates to the outline of the present invention in the Summary of the Invention and to the derivations provided in the Detailed Description of the Invention above. FIG. 7 is the actual deconvolution result for the $C_2Cl_4$ contrived data using the values of FIGS. 2 and 3 as input.

To test the validity of this approach and to evaluate the effect of noise on the results, test data for ethylene chloride based upon the theoretical isotopic cluster was generated. Signal intensity and peak width was varied and Poisson statistics were assumed to add the appropriate amount of noise to each data point. The procedure outlined above was applied to each of 100 independently prepared data sets for each experimental condition. The relative standard deviation for the intensity of the base peak of the cluster and the standard deviation in AMU for the alignment of the cluster was determined.

dard deviation is a dimensionless parameter which is consistent with the statistics for the number of ions in a peak. For example, if a measurement is in units of ions with Poisson statistics then the variance is equal to the mean and the standard deviation is the square root of the mean. A measurement of 10000 ions will therefore have a standard deviation of 100 and a relative standard deviation of 1 percent. A measurement of 100 ions will have a standard deviation of 10 and a relative standard deviation of 10 percent. This is the theoretical limit and corresponds to the results for unit resolved peaks.

Figure 9:
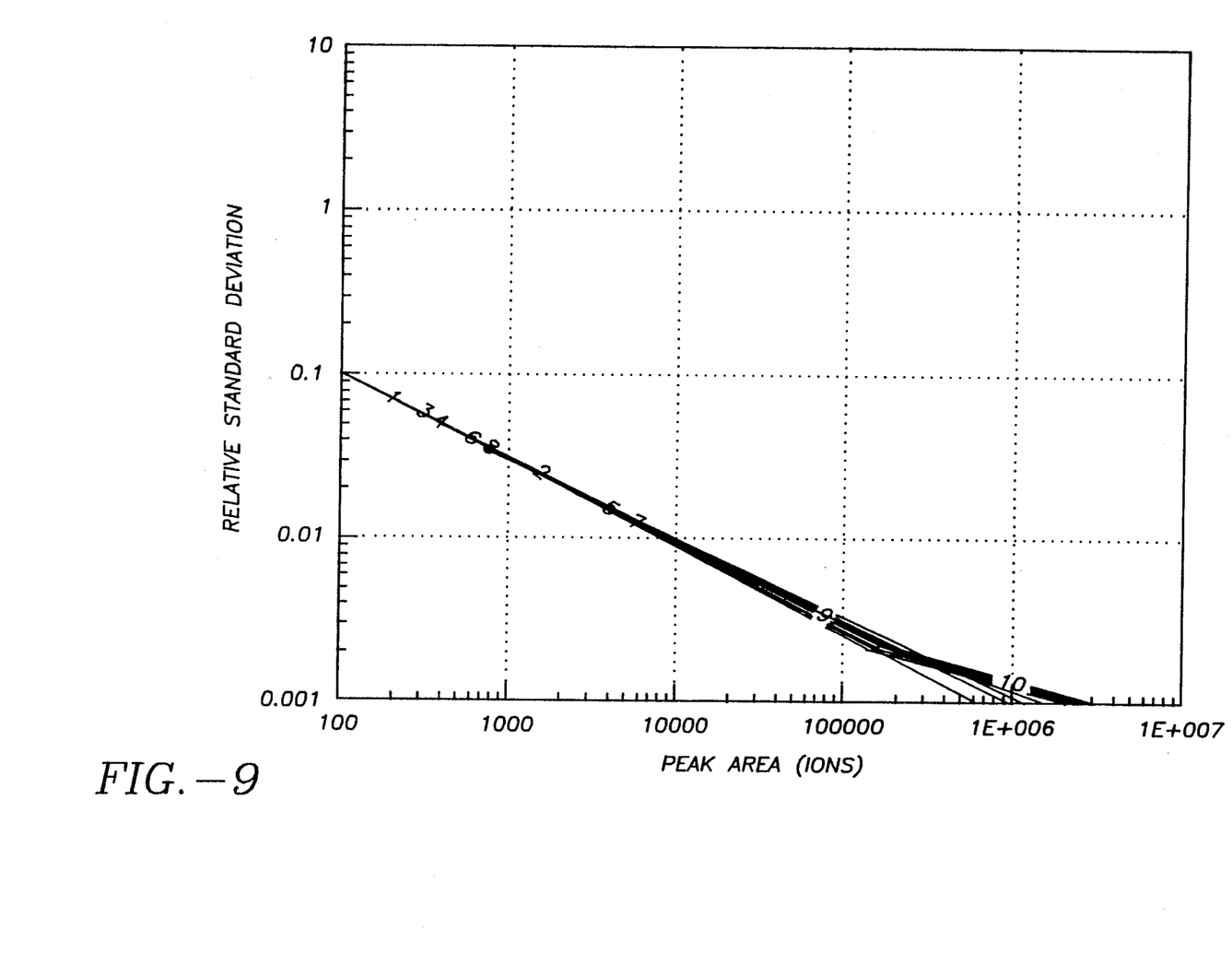
FIG. 9 is a plot similar to FIG. 8 except that the original data is for a monoisotopic peak. There are no overlapping peaks in the cluster even though the peak width is varied. This is a test of the potential accuracy of the algorithm in the absence of interferences and a test of the specific numerical operations in this specific implementation.

The chlorine cluster for tetrachloroethylene has major peaks spaced two AMU apart, so the results for peaks two AMU wide is very close to the results for one AMU. The $C^{13}$ isotope peaks which fall between the main chlorine isotope peaks will show larger errors due to their smaller intensity, but this is not tabulated or plotted. Even when the peaks are very wide, the relative standard deviation varies proportionally with the square root of the peak intensity, with a systematic degradation due to the statistical fluctuation of the signal from the overlapping peaks. When this sequence of experiments is repeated with a single peak, the lines for all peak widths overlap the theoretical limit as expected. This is shown in FIG. 9.

Figure 10:
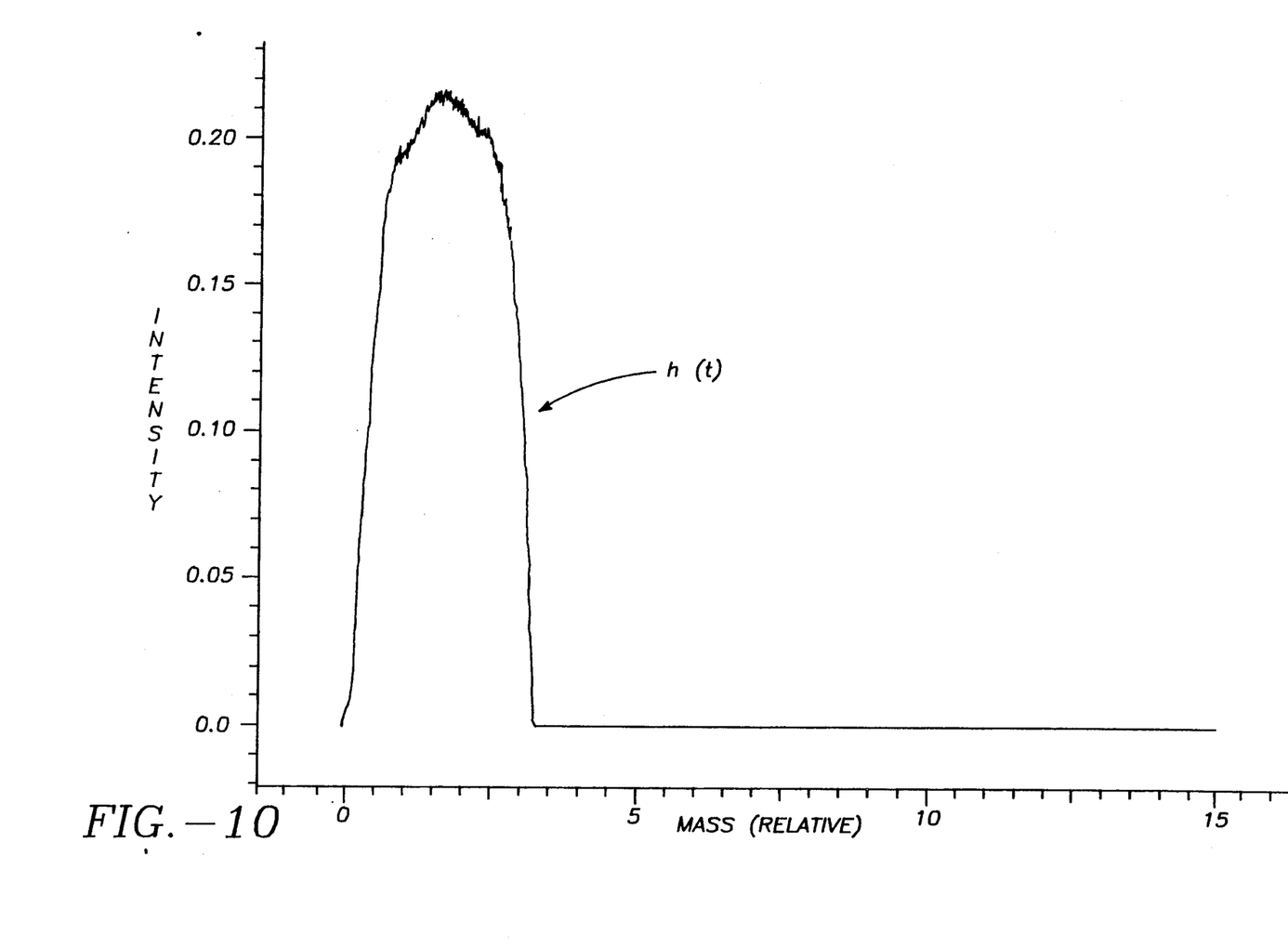
FIG. 10 is an actual instrument response from a triple quadrupole mass spectrometer. The monoisotopic peak is provided by setting one analyzer to the chosen mass with sufficient resolution to exclude the neighboring isotopic peaks. The peak shape is from a scan of the other analyzer with the resolution set to the same resolution to be used in the acquisition of the molecular cluster.

FIG. 10 is an actual instrument response from a triple quadrupole mass spectrometer. The monoisotopic peak is provided by setting one analyzer to the chosen mass with sufficient resolution to exclude the neighboring isotopic peaks. The peak shape is from a scan of the other analyzer with the resolution set to the same resolution to be used in the acquisition of the molecular cluster.

Figure 11:
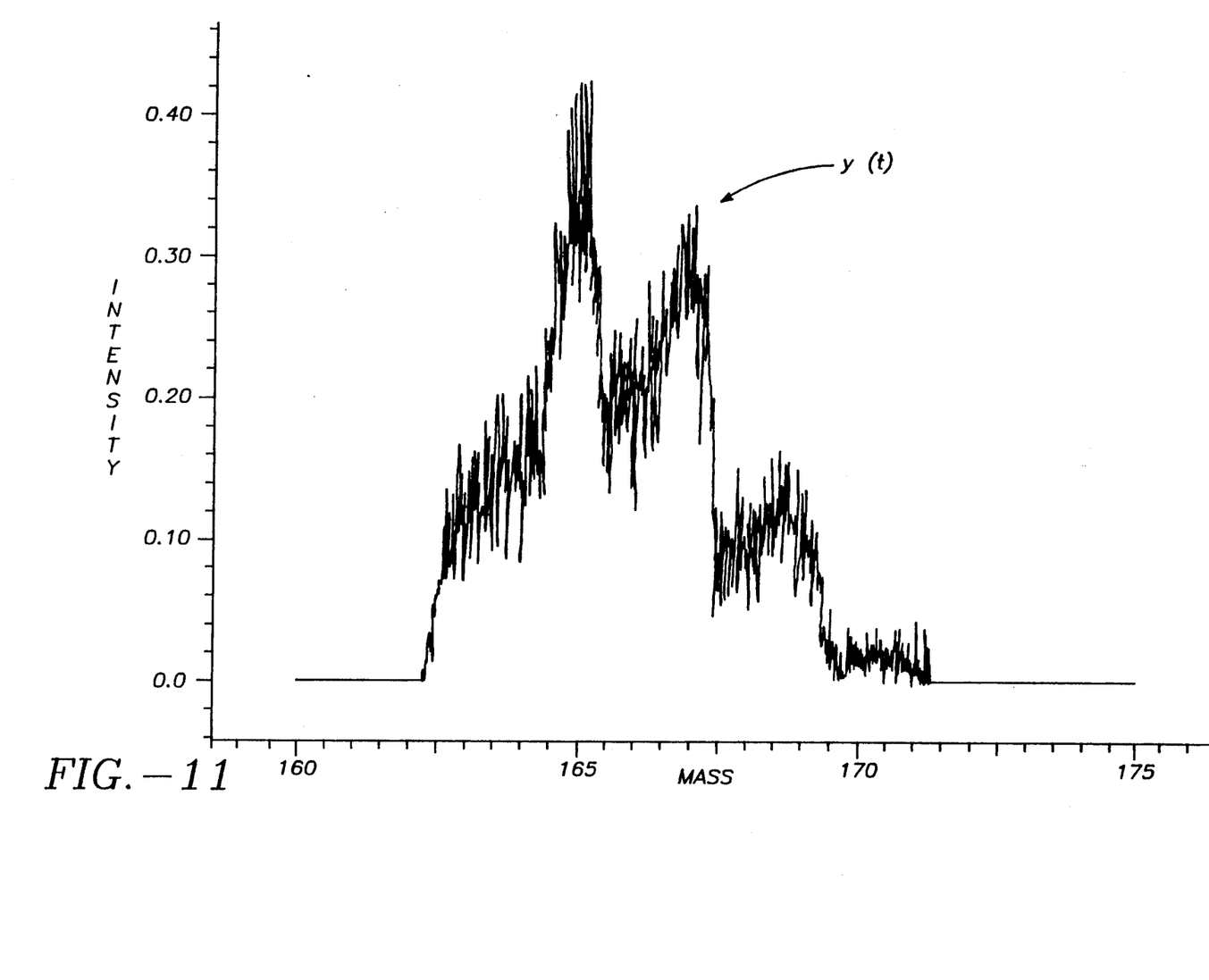
FIG. 11 is a scan of the molecular cluster for tetrachloroethylene with the resolution set as in FIG. 9.
Figure 12:
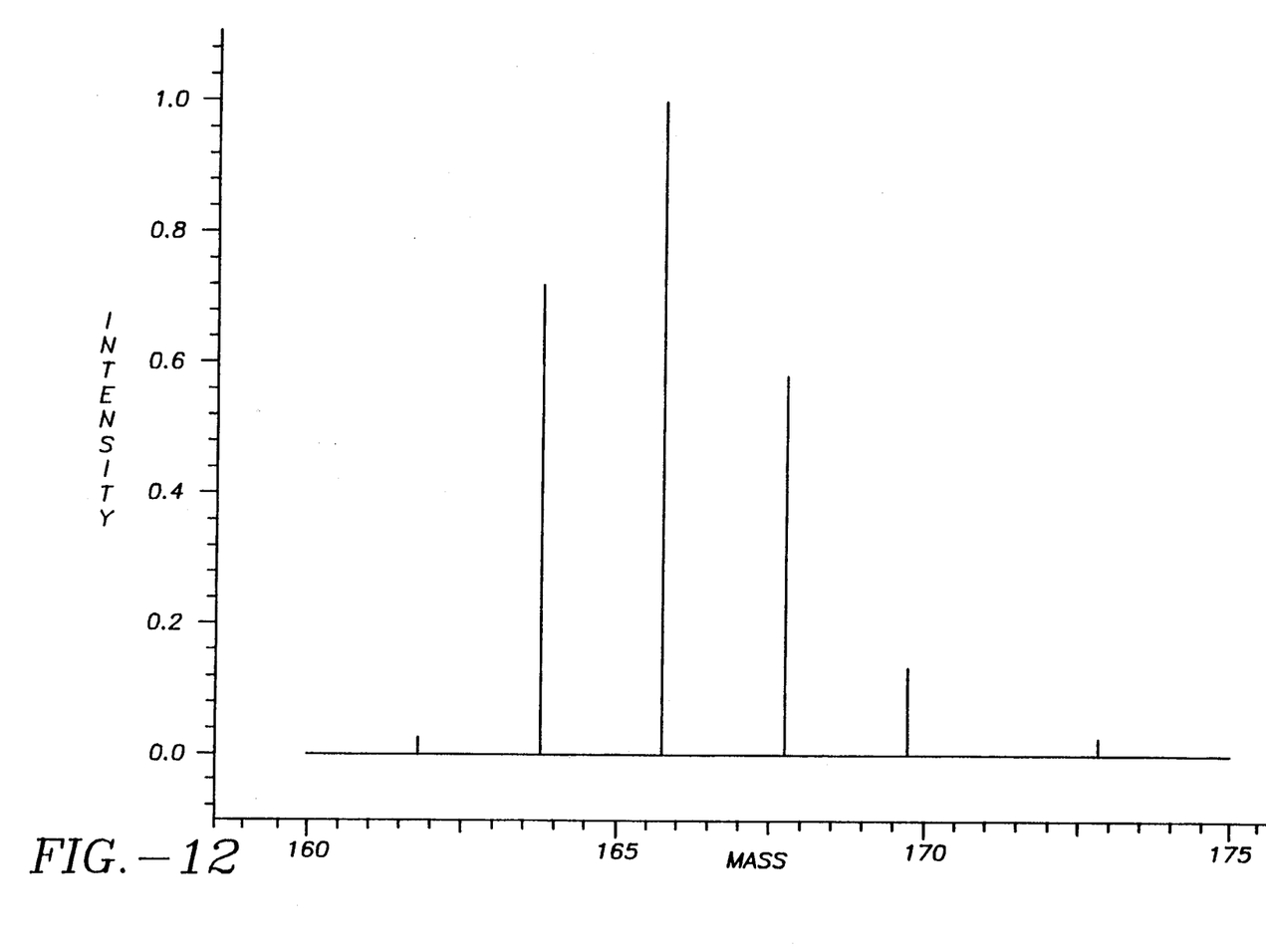
FIG. 12 is the deconvolved result when the method is applied to the data in FIG. 11 and the instrument response from FIG. 10.

FIG. 11 is a scan of the molecular cluster for tetrachloroethylene with the resolution set as in FIG. 10. FIG. 12 is the deconvolved result when the method is applied to the data in FIG. 11 and the instrument response from FIG. 10.

Another series of experiments investigated the effect of samples per amu on the intensity and mass position results. There was no significant effect on the intensity results as a function of samples per AMU. There was a small effect on the average mass error as a function of samples per AMU, but in general, there was no detrimental effect from having too many samples per AMU.

| | Relative Standard Deviation for Tetrachloroethylene 50 samples per AMU - Flux in Ions/sample | | | | | | | | | |
|---|---|---|---|---|---|---|---|---|---|---|
| AMU FLUX | =1 | =2 | =3 | =4 | =5 | =6 | =7 | =8 | =9 | =10 |
| 1 | .20 | .14 | .32 | .50 | .70 | .74 | .81 | .86 | 1.1 | .88 |
| 10 | .05 | .04 | .09 | .14 | .17 | .20 | .30 | .33 | .32 | .31 |
| 100 | .01 | .01 | .03 | .04 | .05 | .07 | .07 | .07 | .08 | .10 |
| 1000 | .00 | .00 | .01 | .01 | .01 | .02 | .02 | .02 | .03 | .03 |
| 1000 | .00 | .00 | .00 | .00 | .00 | .01 | .01 | .01 | .01 | .02 |

Figure 8:
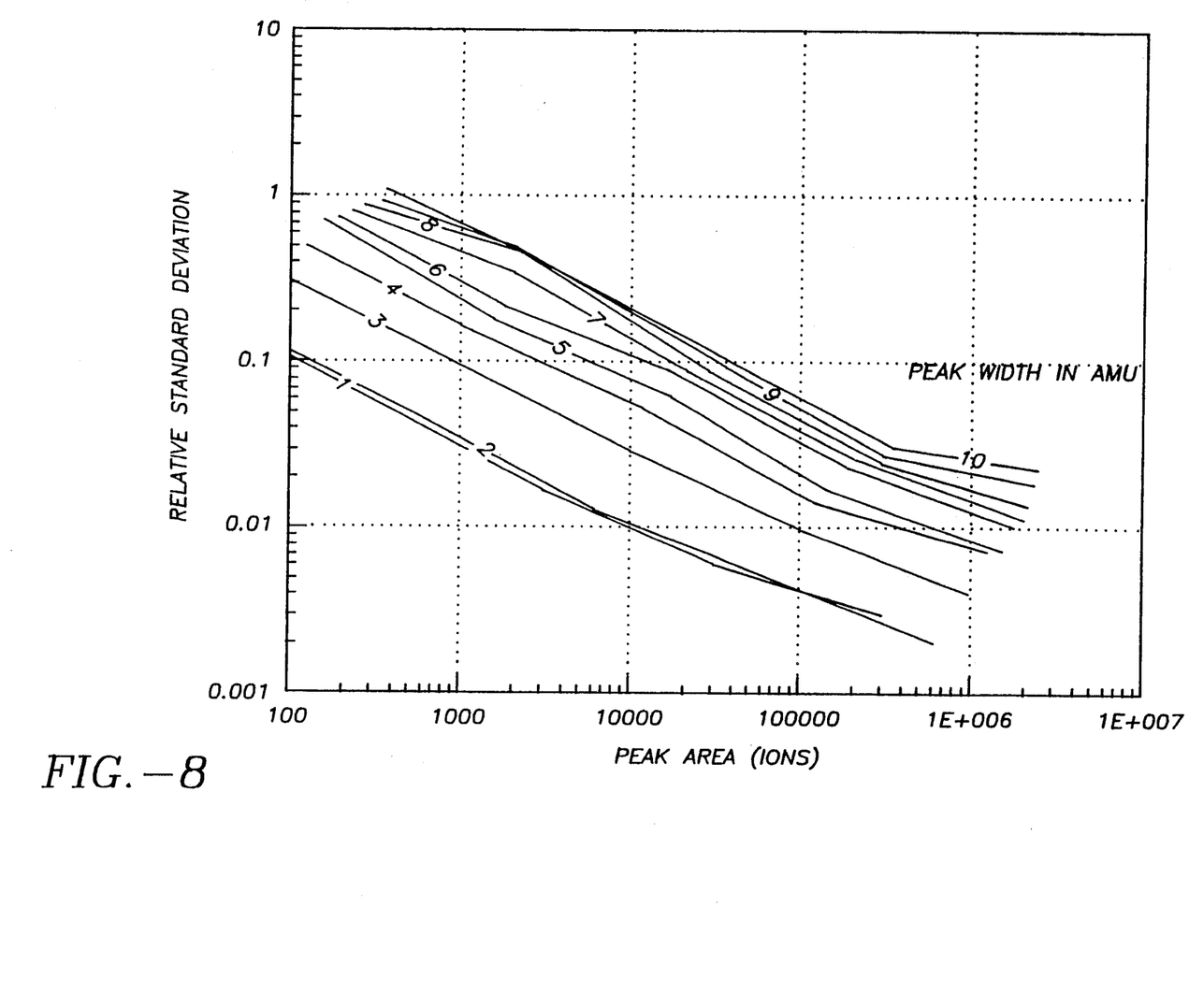
FIG. 8 is a plot of the logarithm of the relative standard deviation in the intensity result for the base peak in the cluster as a function of the logarithm of the peak area in ions for that peak. Results are for 100 independent trials for each combination of peak area and width.

When the peak width is one AMU the variation in the intensity is consistent with the overall Poisson statistics for the total number of ions observed in the area of each peak. The line on FIG. 8 for one AMU wide peaks is the theoretical limit for the expected relative standard deviation. As the peak width increases, the noise from neighboring peaks begins to contribute to the variance in the underlying peak's area such that the variance depends not only on the Poisson statistics of the individual peak, but also on the statistics of the overlapping or interfering peaks. The lines for the wider peaks are therefore dependent upon the data. The relative stan- Too few samples per AMU limits the possible results, since the peaks are assumed to be aligned with one of the sample positions. If the sample position fortuitously falls at the correct peak position, then errors are suppressed since the next nearest possible position is significantly different from the correct one. If the samples are not aligned exactly with the correct position of a peak, then the correct answer is impossible. The best approach is to use a fine enough sample spacing to allow the required precision. For example, if answers to the nearest tenth of an AMU are sufficient, then perhaps twenty samples per AMU are adequate.

The method may also be applied to other peak densities. By simply specifying a smaller fixed spacing between peaks, peaks may be found at those positions. For example, clusters of multiply charged ions have peaks with mass to charge ratios at fractional spacing. At the limit, the method may be applied with peaks enabled at every sample position. In practice, however, the fewest appropriate number of peaks gives the best results by constraining the answer.

Optimum results are obtained when the cluster to be deconvolved is isolated and the data falls to baseline on either side of the cluster. This is sometimes not possible and some form of windowing is necessary. One method of forcing the signal to baseline is to deconvolve the data from one side and subtract the results convolved with the instrument response. This should remove most of the signal from the data buffer on the leading edge. It is also possible to use this method within an iterative loop as described in *Numerical Recipes in C* as a method for improving the results.

In summary, the present invention provides a method and apparatus for obtaining the best estimate for the position and intensity of each peak in a cluster of mass spectral peaks. Given the instrument's response to a single mass (see FIG. 2) and the instrument's response to a series of masses (see FIG. 3), the present invention extracts the mass spectrum by deconvolution of unresolved spectral data. The result is a discrete mass spectrum (see FIG. 7) with significantly reduced noise.

While the present invention has been shown and described in what is presently conceived to be the most practical and preferred embodiment of the invention, it will become apparent to those of ordinary skill in the art that many modifications thereof may be made within the scope of the invention, which scope is to be accorded the broadest interpretation of the claims so as to encompass all equivalent structures.

What is claimed:

1. An apparatus for generating a discrete mass spectrum output having peak positions and corresponding intensities, said apparatus having an instrument response representative by a reference peak shape value, means for generating a series of impulses, a data acquisition system for obtaining a spectrum of an unresolved cluster of peaks comprising said series of impulses wherein said series of impulses is the convolution of said apparatus' response to a model impulse and said discrete mass spectrum, and a computer, said apparatus comprising the steps of:

means for obtaining said instrument's response to a model impulse and recording said instrument's response to a model impulse in said computer;

means for detecting said series of impulses convolved with said instrument's response, and recording said convolved series of impulses in said computer;

means for extracting from said convolved series of impulses the intensity and position of each of said series of impulses wherein said extraction means comprises a computer program stored in said computer which utilizes a least squares method to obtain the intensity and position of each impulse of said series of impulses with the constraint that said series of impulses are spaced with a constant interval; and means for providing as an output of said computer, said discrete mass spectrum.

2. An apparatus as recited in claim 1 wherein said computer program for extracting said intensity of each of said series of impulses, comprises:

(a) means for generating the autocorrelation matrix for said instrument's response and storing said autocorrelation matrix in said computer;

(b) means for generating the inverse or pseudoinverse of said autocorrelation matrix and storing said inverse or pseudoinverse in said computer;

(c) means for selecting a starting sample index of said spectrum of said unresolved cluster of peaks;

(d) means for generating a cross correlation vector therefrom and storing said cross correlation vector in said computer; and (e) means for generating a result vector having elements of weighting coefficients from said inverse or pseudoinverse of said autocorrelation matrix and said cross correlation vector, and storing said result vector in said computer.

3. An apparatus as recited in claim 1 wherein said computer program for extracting said position of each of said series of impulses comprises:

(f) means for convolving said reference peak shape value of said instrument's response and said result vector, and storing said convolution in said computer; and (g) means for comparing by calculating the mean square error of said convolution of said reference peak shape value of said instrument's response and said result vector with said spectrum of data of an unresolved cluster of peaks, and storing said comparison in said computer;

(h) means for incrementing said starting sample index and repeating (d) through (g).

(i) means for repeating (h) until said incremented starting sample as spanned the interval of said peak spacing; and (j) means for selecting the lowest mean square error of said convolution of said reference peak shape value of said instrument's response and said result vector to generate the peak positions of said discrete mass spectrum output and correlating said peak positions with said result vector as the corresponding intensities of said discrete mass spectrum output.

4. A method utilizing a mass spectrometer instrument having a response represented by a reference peak shape value, a data acquisition system for obtaining a spectrum of an unresolved cluster of peaks, and a computer having a data buffer, said method for generating a discrete mass spectrum output having peak positions and corresponding intensities, comprising the steps of:

(a) obtaining a reference peak shape value of said instrument's response and storing said reference peak shape value in said computer;

(b) inputting into said computer a peak spacing interval consistent with said reference peak shape value;

(c) generating the autocorrelation matrix for said instrument's response and storing said autocorrelation matrix in said computer;

(d) generating the inverse or pseudoinverse of said autocorrelation matrix and storing said inverse or pseudoinverse in said computer;

(e) obtaining a spectrum of data of an unresolved cluster of peaks having sample indices and storing said spectrum in said computer;

(f) selecting a starting sample index of said spectrum of said unresolved cluster of peaks, wherein said starting sample index at the beginning of said data buffer containing data obtained in step (e), (g) generating a cross correlation vector from data obtained in step (e) and said instrument's response obtained in step (a);

(h) generating a result vector of weighting coefficients from said inverse or pseudoinverse of said autocorrelation matrix and said cross correlation vector, and storing said weighting coefficients in said computer;

(i) convolving said reference peak shape value of said instrument's response and said result vector, and storing said convolution in said computer;

(j) comparing by calculating the mean square error of said convolution of said reference peak shape value of said instrument's response and said result vector with said spectrum of data of an unresolved cluster of peaks, and storing said comparison in said computer;

(k) incrementing the said starting sample index and repeating steps (g) through (j);

(l) repeating step (k) until said incremented starting sample has spanned the interval of said peak spacing; and (m) selecting the lowest mean square error of said convolution of said reference peak shape value of said instrument's response and said result vector to generate the peak positions of said discrete mass spectrum output and correlating said peak positions with said result vector as the corresponding intensities of said discrete mass spectrum output.

5. A method utilizing a mass spectrometer instrument having a response represented by a reference peak shape value, a data acquisition system for obtaining a spectrum of an unresolved cluster of peaks and a computer having a data buffer and a computer program, said method for generating a discrete mass spectrum output having peak positions and corresponding intensities, comprising the steps of:

obtaining said instruments response to a model impulse;

recording said instrument's response in said computer;

detecting said series of impulses convolved with said instrument's response;

recording said convolved series of impulses in said computer;

extracting from said convolved series of impulses the intensity and position of each of said series of impulses by initiating the use of said computer program stored in said computer wherein said computer program utilizes a least squares method to obtain the intensity and position of each impulse of said series with the constraint that said series of impulses are spaced with constant interval; and providing an output of said discrete mass spectrum as an output from said computer.

* * * * *